United States Patent [19]

Emilsson et al.

[11] 4,454,932
[45] Jun. 19, 1984

[54] SUSPENSION MEANS FOR A RAIL VEHICLE DISC BRAKE UNIT

[75] Inventors: Fred S. Emilsson, Trelleborg; Lars M. Severinsson, Hishult; Bo G. Stensson, Brösarp, all of Sweden

[73] Assignee: SAB Industri AB, Landskrona, Sweden

[21] Appl. No.: 395,074
[22] PCT Filed: Oct. 12, 1981
[86] PCT No.: PCT/SE81/00295
§ 371 Date: May 28, 1982
§ 102(e) Date: May 28, 1982
[87] PCT Pub. No.: WO82/01355
PCT Pub. Date: Apr. 29, 1982

[30] Foreign Application Priority Data
Oct. 16, 1980 [SE] Sweden .................... 8007261

[51] Int. Cl.³ .................................... B61H 13/38
[52] U.S. Cl. .................... 188/59; 188/206 R; 267/3
[58] Field of Search ............... 188/59, 58, 72.6, 153, 188/205 R, 206 R; 105/130, 182 R, 190 A, 193, 197 A; 267/63 R, 3, 140, 153

[56] References Cited
U.S. PATENT DOCUMENTS

| 2,211,463 | 8/1940 | Hobson | 267/3 |
| 2,286,967 | 6/1942 | Kepner | 267/3 |
| 2,445,723 | 7/1948 | Brown | 267/63 R |
| 2,781,990 | 2/1957 | Via | 267/63 R |
| 2,873,004 | 2/1959 | Polanin | 188/59 |
| 2,908,341 | 10/1959 | Nallinger | 267/63 R |
| 3,122,219 | 2/1964 | Altherr | 188/59 |
| 3,624,765 | 11/1971 | Hauth | 188/59 |
| 3,712,246 | 1/1973 | Lich | 105/197 A |
| 3,957,318 | 5/1976 | Wiebe | 267/3 |

FOREIGN PATENT DOCUMENTS

| 1800595 | 8/1977 | Fed. Rep. of Germany . |
| 2615243 | 10/1977 | Fed. Rep. of Germany . |
| 1256713 | 12/1971 | United Kingdom . |

*Primary Examiner*—Bruce H. Stoner, Jr.
*Assistant Examiner*—Robert J. Oberleitner
*Attorney, Agent, or Firm*—Laurence R. Brown

[57] ABSTRACT

Suspension for a rail vehicle disc brake unit (1) comprises a suspension console (11) to be attached to a vehicle bogie or underframe, a cradle (13) movably attached to the console, and suspension links (17, 18) pivotally connecting the brake pad holders (6) to the cradle. A further supporting connection (19–21) is provided between the console and the brake unit. In order to obtain the desired mobility for the brake disc during braking there is between the console (11) and the cradle (13) a joint (14), which is stiff in the brake force transmission direction but comparatively resilient in other directions. The supporting connection (19–21) has basically the same properties.

7 Claims, 5 Drawing Figures

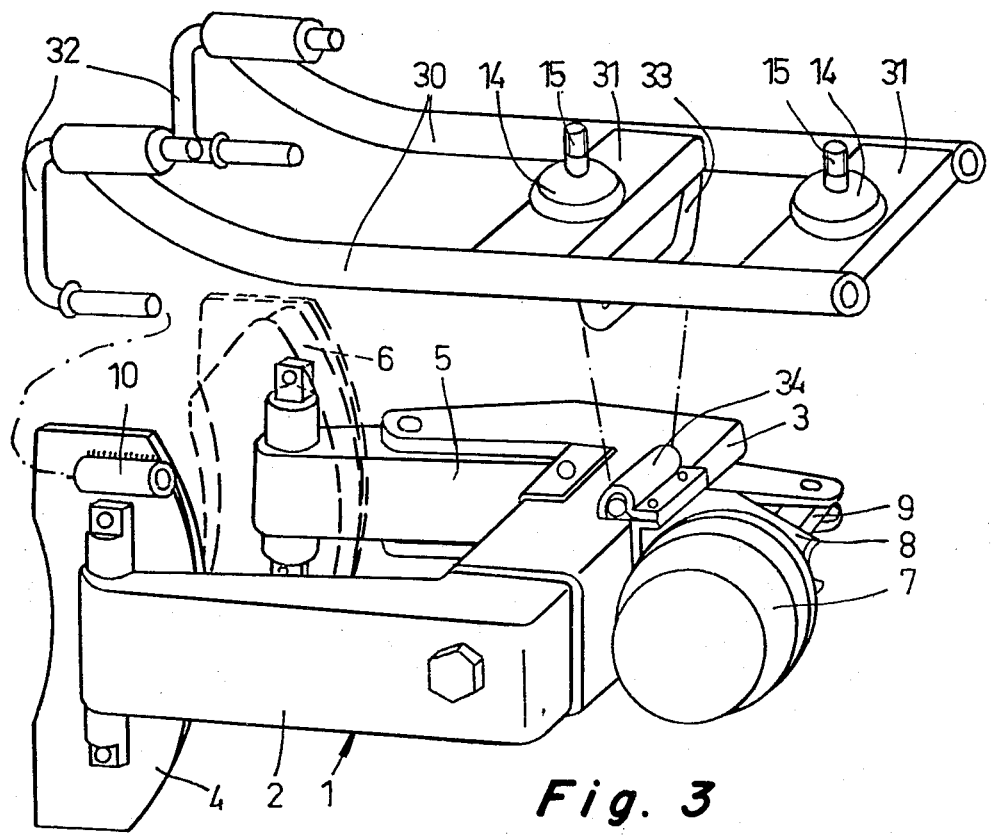
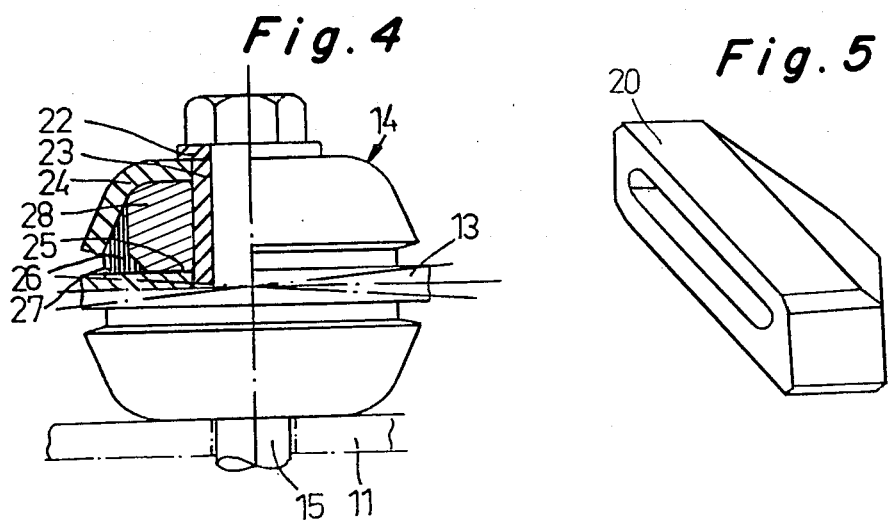

SUSPENSION MEANS FOR A RAIL VEHICLE DISC BRAKE UNIT

TECHNICAL FIELD

This invention relates to suspension means for a rail vehicle disc brake unit, which includes a yoke or caliper, brake pad holders associated therewith, and a brake cylinder for applying brake pads on the brake pad holders against a brake disc, the suspension means comprising suspension links, pivotally connected to the brake pad holders and, indirectly or directly, to a suspension console or framework, which is attached to a bogie or underframe of the vehicle, and a further supporting connection between the console or framework and the brake unit.

BACKGROUND ART

Suspension means with consoles or frameworks for unit-type disc brake arrangements are known, for example through U.S. Pat. No. 2,873,004, GB No. 1,256,713 and DE No. 2 615 243. Advantages with such a console or framework are that the original mounting of the disc brake unit on the bogie or underframe is greatly facilitated in that only simple mounting arrangements are required on the vehicle and that a completely prefabricated disc brake is mounted by means of for example a few bolts. The corresponding advantage is obtained at a replacement or repair, when a new disc brake may be fitted in a very short time.

Movements in different directions of a wheel-set relative to the vehicle part in its vicinity on which a disc brake suspension console or framework is mounted will always occur, and there is presently a tendency to deliberately enhance this freedom of movement.

For obtaining a satisfactory brake operation it is therefore of increasing importance to enable the suspension means to follow the movements of the brake disc on the wheel-set also during braking, such movements being both translational and angular.

THE INVENTION

This is according to the invention attained in that the suspension means include connection means, which are stiff in the normal brake force transmission direction but comparatively resilient in other directions.

It is preferred that a connection means according to the invention comprises a joint, mainly consisting of a screw, which is to be attached to a fixed member and loosely extends through a hole in a member to be conditionally movable relative to the fixed part, a bell-shaped cover arranged on each side of the movable part around the screw, and a ring-shaped rubber cushion filling the compartment defined by each cover, the movable member and the screw.

In this joint a force transmitting tube is preferably arranged around the screw, and a sealing ring preferably of a plastic material is arranged around the rubber cushion in sealing contact with the movable member and slidable against the cover.

In an embodiment preferred for an axle-mounted brake disc, where it is possible to have arrangements close to the disc, the joint is arranged between a console, which is to be attached to the bogie or underframe of the vehicle and is the fixed member, and a cradle, to which the suspension links are pivotally attached and which is the movable member.

Such an advantageous cradle design is per se known through DE No. 1 800 595 and U.S. Pat. No. 3,624,765, but in those cases there are no mounting consoles or joints as in the present case.

It is not possible to take advantage of the positive properties of the cradle and joint, if the further supporting connection between the console and the brake unit is non-resilient.

This connection is therefore according to a further feature of the invention in the form of a resilient guide block, into which a tongue of the console extends and which is loosely clamped between the brake unit and a bracket mounted thereon.

The normal brake reaction force is tangential to the brake disc, i.e. substantially in the direction of the suspension links. However, when a vehicle is just about to come to a stand-still, the brake reaction force may turn over to being radial to the brake disc or perpendicular to the normal reaction force. This momentary direction change is due to the resiliency in the vehicle suspension and the mass forces.

The otherwise required reinforcement of the cradle and other parts in the suspension means for taking care of this momentary reaction force may be obviated, if rubber bushings are arranged between the cradle and each suspension link on the pivotal axis for the latter. Also the guide block at the further supporting connection is resilient enough to take care of this reaction force.

In the case of a wheel-mounted brake disc there is no possibility to arrange the disc brake suspension close to the disc (in the manner described above) as at least the wheel rim extends radially outside the disc. For this reason the inventive idea is here realized in that two joints are arranged between a rigid framework, to which the suspension links are pivotally attached, and the bogie or underframe of the vehicle.

In this embodiment the further supporting connection between the framework and the brake unit may be in the form of a framework bracket cooperating with a corresponding brake unit attachment.

BRIEF DESCRIPTION OF THE DRAWINGS

The invention will be described in further detail below reference being made to the accompanying drawings, in which FIG. 3 is a perspective, partly exploded view of a different embodiment of a disc brake arrangement with suspension means according to the invention, FIG. 4 is a partly sectional side view to a larger scale of a joint, and FIG. 5 is a perspective view, also to a larger scale, of a so called guide block for the suspension means according to FIGS. 1 and 2.

DESCRIPTION OF PREFERRED EMBODIMENTS

Suspension means according to the invention may be used for many different types of rail vehicle disc brake calipers or yokes cooperating with wheel-mounted brake discs or separate axle-mounted discs. In the embodiments shown and described, however, a special type of disc brake yoke is used. Only a relatively brief description of the yoke with associated parts, below referred to as a disc brake unit, is given. This unit does not form any part of the present invention.

Figure 1:
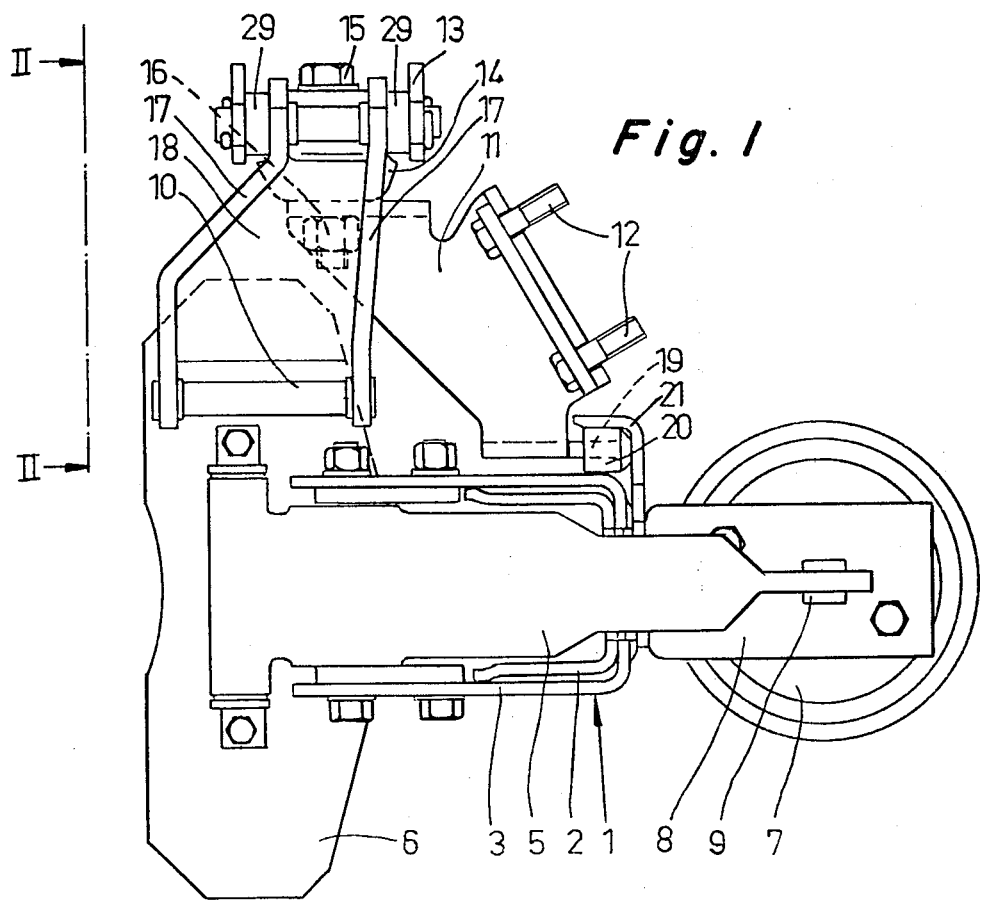
FIG. 1 is a side view of a disc brake arrangement with suspension means according to the invention.

The disc brake unit 1, as shown in FIG. 1 and also in FIG. 3, but there in perspective, is of the following general design:

A fixed yoke part 2 and a telescopically movable yoke part 3 together form a yoke with a width between its legs depending on the operation of a slack adjuster of any conventional design built into and acting between said two parts. A brake pad holder 4 with a brake pad is attached to the fixed yoke part 2. A yoke lever 5, at its end provided with a pivotable brake pad holder 6 with a brake pad, is pivotally attached to the movable yoke part 3. A fluid operated brake cylinder 7 is attached to a bracket 8 on the movable yoke part 3 and acts on the yoke lever 5 with its piston rod 9. Each brake pad holder 4 and 6 is provided with a suspension attachment 10.

Figure 2:
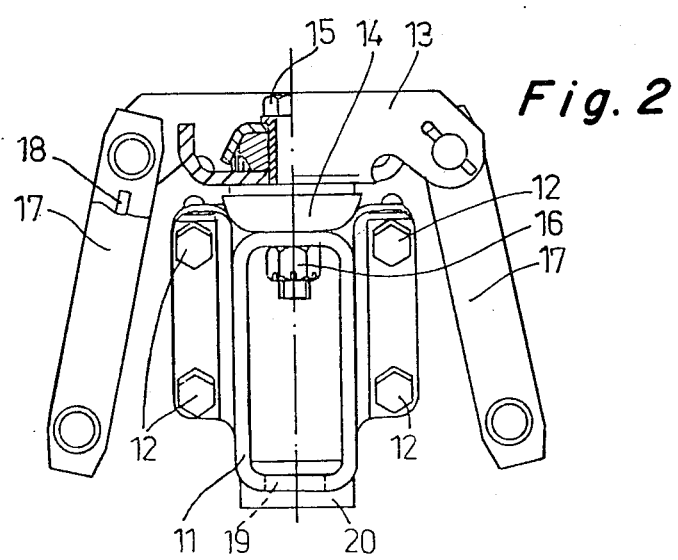
FIG. 2 is a partly sectional end view only of said suspension means according to the arrows II—II in FIG. 1.

Turning now specifically to the embodiment according to FIGS. 1 and 2, suspension means for the disc brake unit 1–7 may be of the following design, if the brake unit is to cooperate with an axle-mounted disc (not shown) on the rail vehicle.

A rigid console 11 is to be attached to a suitable part of a vehicle underframe or bogie (not shown), for example by means of bolts 12. A cradle 13 is connected to the console 11 via a connection means in the form of a joint 14 (shown in FIG. 4), which in a way to be described below is relatively soft in certain directions but stiff in others. The joint itself is provided with a screw 15 and is thus attached to the framework 11 by means of a nut 16.

Suspension links, each consisting of two legs 17 and a connecting and stiffening web 18, are pivotally attached to the cradle 13 and are also to be pivotally attached to the suspension attachments 10 on the brake pad holders 4 and 6 as shown in FIG. 1.

For a purpose to be described below two rubber bushings 29 are arranged between the cradle 13 and each suspension link 17, 18 on the pivotal axis for the latter. alternatively, corresponding resilient means may be provided somewhere else for allowing limited movements for the suspension links in the same direction as the bushings 29.

The lower end of the console 11 may be connected to the disc brake unit 1 by means of a tongue 19 inserted in a resilient guide block 20 (shown in FIG. 5), which also may be called a connection means and is relatively loosely clamped between the movable yoke part 3 and a bracket 21 mounted thereon.

The joint 14 is shown to a larger scale in FIG. 4. Only a segment of one of its halves is sectioned, but the two halves are identical but inverted. The screw 15 passes through the whole joint, and a washer 22 is placed between the screw head and the joint itself. A tube 23 is arranged around the screw 15, and when the joint is clamped against for example the console 11, this tube 23 will be force-transmitting. The tube 23 and thus also the screw 15 extend through a hole in the member to be joined, for example the cradle 13, around which the joint is built up.

Each half of the joint 14 then consists of a bell-shaped cover 24, a sealing ring 25, preferably of a plastic material, between the cradle 13 and the tube 23, a second sealing ring 26, surrounded by a metal ring 27, between the cradle 13 and the cover 24, and in the compartment defined by said parts a ring-shaped rubber cushion 28.

As the rubber cushion 28 is confined in the joint 14 as described above, its properties will be close to those of a hydraulic medium, which means that only limited translational movements of the cradle 13 (in the plane thereof and in the longitudinal direction of the screw 15) will be allowed, whereas its freedom to make rocking movements as indicated with dash-dotted lines in FIG. 4 and turning movements in its plane is considerably greater. In other words, the joint 14 is stiff in its intended force-transmitting direction along its longitudinal axis.

The guiding block 20 for the FIGS. 1 and 2 embodiment is preferably made of a rubber material and has also the property of being comparatively stiff in the same force-transmitting direction as the joint 14 but more resilient in other directions and will thus supplement the joint 14.

The result obtained by the described suspension means for the disc brake arrangement shown in FIG. 1 is basically that different movements and inclinations of the brake disc relative to the console 11 are allowed during braking without negative effects on the ability of the arrangement to properly transmit the braking forces from the brake disc to the console 11 and further to the vehicle underframe. It may also be noted that after each braking the different parts of the whole arrangement will return to their shown rest positions due to the design of the joint 14 and also the guide block 20.

The brake disc movements can be separated as translational movements in the track direction (x), perpendicular thereto in the same plane (z) and in the vertical direction (y) as well as angular movements in the vertical plane ($\alpha$) and in the horizontal plane ($\beta$).

In the described arrangement the brake force transmission is normally substantially in the y-direction, where the suspension is stiff. Movements in the x-direction are taken up by the bushings 29 and by the supporting connection 19–21. Such movements may occur, when the vehicle is just about to come to a stand-still during braking and the brake force direction is momentarily shifted over from the y-direction to the x-direction due to the resiliency in the vehicle suspension and the mass forces. Movements in the z-direction are taken up by an angular or rotational movement of the cradle 13 in the joint 14 and also a corresponding movement in the supporting connection 19–21; this is generally true also for the angular $\alpha$ and $\beta$ movements.

In other words, the joint 14 is stiff against translational movements of the cradle 13 but considerably more resilient to rotational or angular movements both around its axis and perpendicular thereto.

The design shown in FIGS. 1 and 2 may only be used for axle-mounted discs, as in the case of a wheel-mounted disc the wheel will extend radially further out than the disc and will necessitate suspension means on either side of the wheel. Such a design is shown in FIG. 3.

Two longitudinal rod-like members 30 and two (or more) cross bars 31 together constitutes a framework, which may be attached to a bogie or an underframe of a rail vehicle by means of screws 15 in joints 14 of the same type as described above. In the same manner as earlier stated the provision of the joints 14 between the framework 30, 31 and the vehicle will enable the framework to rock and turn to a certain extent without any negative effects on the ability of the framework to transmit forces mainly in the direction perpendicular to the plane of the framework 30, 31.

A suspension link 32 is pivotally attached to each member 30 and is intended for pivotal connection to the suspension attachment 10. A bracket 33 is attached to the cross bar 31 nearest to the suspension links 32 and is to be connected to an attachment 34 on the movable yoke part 3. Lateral movements, for example due to the pad wear, will be allowed between the bracket 33 and the attachment 34 due to the smaller width of the attachment than of the bracket.

Without again going into details about the movements in the different directions the reasoning above about the function of the embodiment according to FIGS. 1 and 2 is generally true also for the embodiment according to FIG. 3; different rotational movements will be permitted but substantially no translational movements.

In the embodiment according to FIGS. 1 and 2 it should be noted that the suspension links 17, 18 are comparatively stiff. One important result of this is that slanted wear of the brake pads will be minimized due to the fact that the two brake pad holders 4, 6 will be guided together by the cradle 13, for example when the brake disc moves angularily.

Different modifications are possible within the scope of the appended claims. Especially it should be noted that a great variety of disc brake arrangements may be used together with a suspension with the claimed feature.

We claim:

1. Suspension means for a rail vehicle disc brake actuating unit on a bogie of a vehicle, which comprises in combination a caliper, brake pad holders with brake pads associated therewith, and a brake cylinder for applying said brake pads on the brake pad holders against said brake disc, suspension links pivotally connected to the brake pad holders and to a suspension framework attached to said bogie of the vehicle, and a further supporting connection means between the framework and the brake unit comprising suspension means including connection means comprising a block of rubberlike material stiff in the brake pad application direction of vertical coordinate y but comparatively resilient in other coordinate directions x and z to permit movement in the two other dimensions x and z and angular movements in the vertical y and horizontal (x, z) planes, characterized in that said connection means comprises a fixed member, a member conditionally movable relatively thereto, a joint comprising a screw attached to said fixed member and loosely extending through a hole defined in said member conditionally movable relative thereto, a bell-shaped cover arranged on each side of the movable part around the screw to define a compartment, and said block comprising a ring-shaped rubber cushion filling the compartment defined by each cover, the movable member and the screw.

2. Suspension means according to claim 1, characterized in that a force transmitting tube is arranged around the screw and that a sealing ring, preferably of a plastic material, is arranged around the rubber cushion in sealing contact with the movable member and slidable against the cover.

3. Suspension means according to claim 1, characterized in that the joint is arranged between a console, which is to be attached to the bogie of the vehicle and is the fixed member, and a cradle, to which a pair of suspension links are pivotally attached to comprise the movable member.

4. Suspension means according to claim 1 or 2, characterized in that the further supporting connection between the fixed member and the brake unit is in the form of a resilient guide block, into which a tongue of the fixed member extends and which is loosely clamped between the brake unit and a bracket mounted on the brake unit.

5. Suspension means according to claim 3, characterized in a pivotal axis to which said links are attached, and resilient bushings arranged between the cradle and each suspension link on the pivotal axis.

6. Suspension means according to claim 3, characterized in wherein said cradle comprises a rigid framework that preferably two joints are arranged between said rigid framework, to which the suspension links are pivotally attached, and the bogie of the vehicle.

7. Suspension means according to claim 6, further comprising a supporting connection between the framework and the brake unit in the form of a framework bracket cooperating with a corresponding brake unit attachment.

* * * * *